United States Patent
Burgert

(10) Patent No.: US 12,038,305 B2
(45) Date of Patent: Jul. 16, 2024

(54) DISPLAY DEVICE FOR INDUSTRIAL SENSOR

(71) Applicant: VEGA Grieshaber KG, Wolfach (DE)

(72) Inventor: Florian Burgert, Gengenbach (DE)

(73) Assignee: VEGA Grieshaber KG, Wolfach (DE)

( * ) Notice: Subject to any disclaimer, the term of this patent is extended or adjusted under 35 U.S.C. 154(b) by 5 days.

(21) Appl. No.: 17/877,099

(22) Filed: Jul. 29, 2022

(65) Prior Publication Data

US 2023/0040598 A1 Feb. 9, 2023

(30) Foreign Application Priority Data

Aug. 4, 2021 (EP) .................................... 21189659

(51) Int. Cl.
*G01D 11/24* (2006.01)
*G01S 7/00* (2006.01)

(52) U.S. Cl.
CPC .............. *G01D 11/24* (2013.01); *G01S 7/00* (2013.01)

(58) Field of Classification Search
CPC .................................. G01D 11/24; G01S 7/00
See application file for complete search history.

(56) References Cited

FOREIGN PATENT DOCUMENTS

| DE | 10 2015 107 570 A1 | 11/2016 | |
|---|---|---|---|
| DE | 102015107570 A1 * | 11/2016 | |
| DE | 10 2016 010 800 A1 | 12/2016 | |
| DE | 102016010800 A1 * | 12/2016 | ............. G01D 13/00 |
| DE | 10 2018 200 261 A1 | 7/2019 | |
| DE | 102018200261 A1 * | 7/2019 | |

OTHER PUBLICATIONS

Extended European Search Report issued Jan. 24, 2022 in European Patent Application No. 21189659.2, 10 pages.

* cited by examiner

*Primary Examiner* — Jamel E Williams
(74) *Attorney, Agent, or Firm* — Oblon, McClelland, Maier & Neustadt, L.L.P.

(57) ABSTRACT

A display device for an industrial sensor is provided, including an electronic display configured to display encoded information, the encoded information being information for retrieving device-related information about the sensor. An industrial sensor system, and a method for retrieving device-related information about a sensor of an industrial sensor, are also provided.

13 Claims, 2 Drawing Sheets

DISPLAY DEVICE FOR INDUSTRIAL SENSOR

CROSS-REFERENCE TO RELATED APPLICATIONS

This application claims the benefit of priority under 35 U.S.C. § 119 to European Patent Application No. 21 189 659.2 filed on 4 Aug. 2021, the entire content of which is incorporated herein by reference.

TECHNICAL AREA

The invention relates to a display device for an industrial sensor, an industrial sensor system, a user device for an industrial sensor system, and a use of optical coding on an electronic display of an industrial sensor.

BACKGROUND

A type plate is often attached to industrial sensors, on which device-specific information is printed. However, the type plate is often small due to the available space and may not be readable over the entire product life cycle in harsh environmental conditions.

There may be a desire to provide an improved industrial sensor.

SUMMARY

The desire is met by the subject matter of the independent patent claims. Advantageous embodiments are the subject of the dependent claims, the following description, and the figures.

The described embodiments similarly relate to the display device for an industrial sensor, the industrial sensor system, the user device for an industrial sensor system, and the use of optical coding on an electronic display of an industrial sensor. Synergistic effects may result from various combinations of the embodiments, although they may not be described in detail.

It should also be noted that all embodiments of the present invention involving a process may be carried out in the order of steps described, but this need not be the sole and essential order of the steps of the process. The methods disclosed herein may be carried out with a different order of the disclosed steps without departing from the particular method embodiment, unless otherwise expressly stated below.

According to a first aspect, there is provided a display device for an industrial sensor comprising an electronic display, wherein the electronic display is arranged to display coded information, the coded information being information for retrieving device-related information about the sensor. The display may be configured as an "e Ink" display, such that in a de-energized state the displayed information is retained. The display may also be remote from the sensor unit, and the connection may be wired or via a radio interface. In the case of radio transmission, the display is battery powered or obtains power from a solar cell or other form of energy harvesting.

An industrial sensor is, for example, a sensor in process automation or plant automation. Such sensors do not necessarily but often have, in addition to the actual physical or chemical measuring sensor, electronics such as an A/D converter, signal conditioning a communication unit and a unit for power supply, whether with or without its own energy storage. Furthermore, there are sensors or modules that can be coupled to the sensors that have an electronic display for showing, for example, measured values or status messages such as battery level, if the sensor has its own battery, error messages or other information. The display device presented here is intended for a sensor that has such an electronic display. The electronic display forms, for example, in addition to further displays or by an operation on the sensor, an optical code which corresponds, for example, to that of the type plate. The display can thereby replace the type plate or display the code in addition to the type plate.

The coded information is information for retrieving device-related information via the sensor. "Via the sensor" is to be understood as device-related information concerning the sensor, i.e., not in the sense of "via/through the sensor".

According to this embodiment, the device-related information is thus not directly encoded in the code, but can be retrieved from an external memory, e.g., by a user device that scans and decodes the code. The information for retrieving device-related information can thus include, for example, a network address, a database address, a memory address, etc.

In addition, device-related information can also be stored in the code. This information is preferably information that does not change over the lifetime of the sensor, such as serial number or information on the power supply, as is also present on the type plate.

According to an embodiment, the encoded information includes a sensor-specific link to a database.

Such a database is, for example, a central database that stores information from multiple sensors and can be easily managed and updated. The retrieved information can therefore include, for example, documentation of the life cycle of the sensor.

The link may have, for example, an ID and/or a serial number for identification.

According to one embodiment, the encoded information is optical coding in the form of a QR code, a bar code, or a numeric code.

Accordingly, the code can be scanned and decoded by a QR code scanner, a barcode scanner, or an OCR scanner.

According to an embodiment, the device-related information about the sensor is one or more of the following: Order code, order history, operating instructions, test certificates, certificates of conformity, safety instructions, backup of device settings, firmware, service instructions, fault code mapping, spare parts lists, predictive maintenance information, SW update recommendations, process seal replacement recommendations, and installation instructions.

According to an embodiment, the display device further comprises a code generator for generating the optical coding.

This allows the sensor, or the display device in the sensor itself, to generate the code, e.g. QR code. The information to be coded can be stored, for example, in an internal memory of the sensor or the display device. This increases the flexibility of the display. However, the code can also be stored in the memory already encoded, e.g., as a graphic code, without having to be generated.

According to an embodiment, the display device further comprises an interface for receiving encoded information, information to be encoded, and/or device-related information.

This means that, for example, a graphic such as a QR code with the coded information can be loaded externally into a memory in the sensor or display device, or the non-coded information, which can then be coded with the code generator and shown in the display. The interface may be an interface to the sensor, which in turn may have a communication unit, or an HMI (human-machine interface) such as buttons or a touch-sensitive display. The interface may further be a near-field communication interface such as an NFC or Bluetooth interface.

This can be useful, for example, in the event of system changes, so that the network address or link can be changed, or current, additional device information can be displayed, which thus does not first have to be retrieved via a database connection. Updating via the interface can be done, e.g., regularly or on demand.

Furthermore, the display device can receive decoded device-related information. In this option, a user device serves as a communication interface with a camera. The user device reads the code via its camera, establishes the connection to the database, receives the device-related information data and sends it to the display device, which can then display it in plain text. For this purpose, the display device interface only needs a receiver for the data, i.e., no energy-intensive transmitter, and the user device only needs a camera and possibly a simple display that can be used, for example, to enter access data for the link. The display of the device-related information is done at the sensor by the display device. The received data could be stored there and, for example, provided with a reception time stamp or a time validity indication, so that data of the last update is constantly visible or can be retrieved even without a user device.

According to another aspect, there is provided an industrial sensor system comprising a sensor having an electronic display device described herein, wherein the electronic display is adapted to display coded information. The industrial sensor system further comprises a database, wherein the database includes device-related information about the sensor, and wherein the sensor provides access to the database by means of the electronic display by displaying the coded information to enable retrieval of the device-related information about the sensor.

"Enable" here means that the device-related information is either retrieved from the database automatically, or that some further action by the user is required, such as a confirmation or an entry of access data.

For this purpose, the code contains a link that can be used to establish a connection to the database, e.g., via a mobile phone connection or an Internet connection. The link can have an ID or a serial number for identification purposes, for example.

The industrial sensor system may further comprise a user device that scans the code, decodes the link, and uses the link to establish the connection to the database. The user device for the industrial sensor system, comprising a camera, configured to scan a coded information displayed on a display device of a sensor according to any one of the preceding claims. The user device may include a decoder for decoding the link to the database containing information about the sensor, a communication unit for establishing a connection to the database, sending the decoded link, and receiving the device-related information about the sensor. In addition, it may include a user interface configured to enter authorization information to retrieve protected device-related information about the sensor. Further, it may include a Bluetooth, NFC, or other wireless interface such that a user may parameterize the second smart card via it.

The link can have other information in addition to the ID. For example, unchangeable data such as year of manufacture, type, etc. can be stored in the link. The user device can then have a parser that extracts this data from the link and already displays this information before connecting or independently of the connection to the database. The parser could also at least partially truncate this information from this link, so that the actual link used to establish the connection only has information to identify the sensor.

According to an embodiment, the database contains at least partially authorization-protected information.

Such information is, for example, personal information.

According to another aspect, there is provided a use of optical coding on an electronic display of an industrial sensor for retrieving device-related information about the sensor.

According to a further aspect, there is provided a method for retrieving device-related information about a sensor of an industrial sensor, comprising the steps of: Displaying, by a display device of the sensor, coded information on an electronic display of the industrial sensor for retrieving the device-related information about the sensor from a database.

The method is not further explained here, since the method corresponds to the configuration of the display device. Reference is made to the description above and the figures. This also applies to the following embodiments.

According to an embodiment, the encoded information contains a link, in particular a sensor-specific link, to the database and an ID of the sensor.

According to an embodiment, retrieving the device-related information about the sensor includes scanning the optical code and decoding the optical code and obtaining a link to a database, establishing a connection to the database using the link; and receiving the device-related information about the sensor from the database via the connection.

Establishing a connection to a database is to be understood as accessing the database, e.g., via a communication network and e.g. a server. Alternatively, the database can also be stored on the user device.

According to an embodiment, the display device receives the device-related information from the database, e.g., by the user device, and displays the information through the electronic display.

Other variations of the disclosed embodiments may be understood and performed by those skilled in the art in carrying out the claimed invention by studying the drawings, the disclosure, and the appended claims. In the claims, the word "comprising" does not exclude other elements or steps, and the indefinite article "a" or "one" does not exclude a plurality. A single processor or other unit may perform the functions of multiple items or steps recited in the claims. The mere fact that certain actions are recited in interdependent claims does not mean that a combination of those actions cannot be advantageously used. A computer program may be stored/distributed on a suitable medium such as an optical storage medium or a semiconductor medium provided with or as part of other hardware, but may also be distributed in other forms, for example, via the Internet or other wired or wireless telecommunications systems. Reference signs in the claims should not be construed to limit the scope of the claims.

BRIEF DESCRIPTION OF THE FIGURES

In the following, embodiments of the invention are explained in more detail with reference to the schematic drawings, which.

Corresponding parts are marked with the same reference signs in all figures.

DETAILED DESCRIPTION OF EMBODIMENTS

Figure 1:
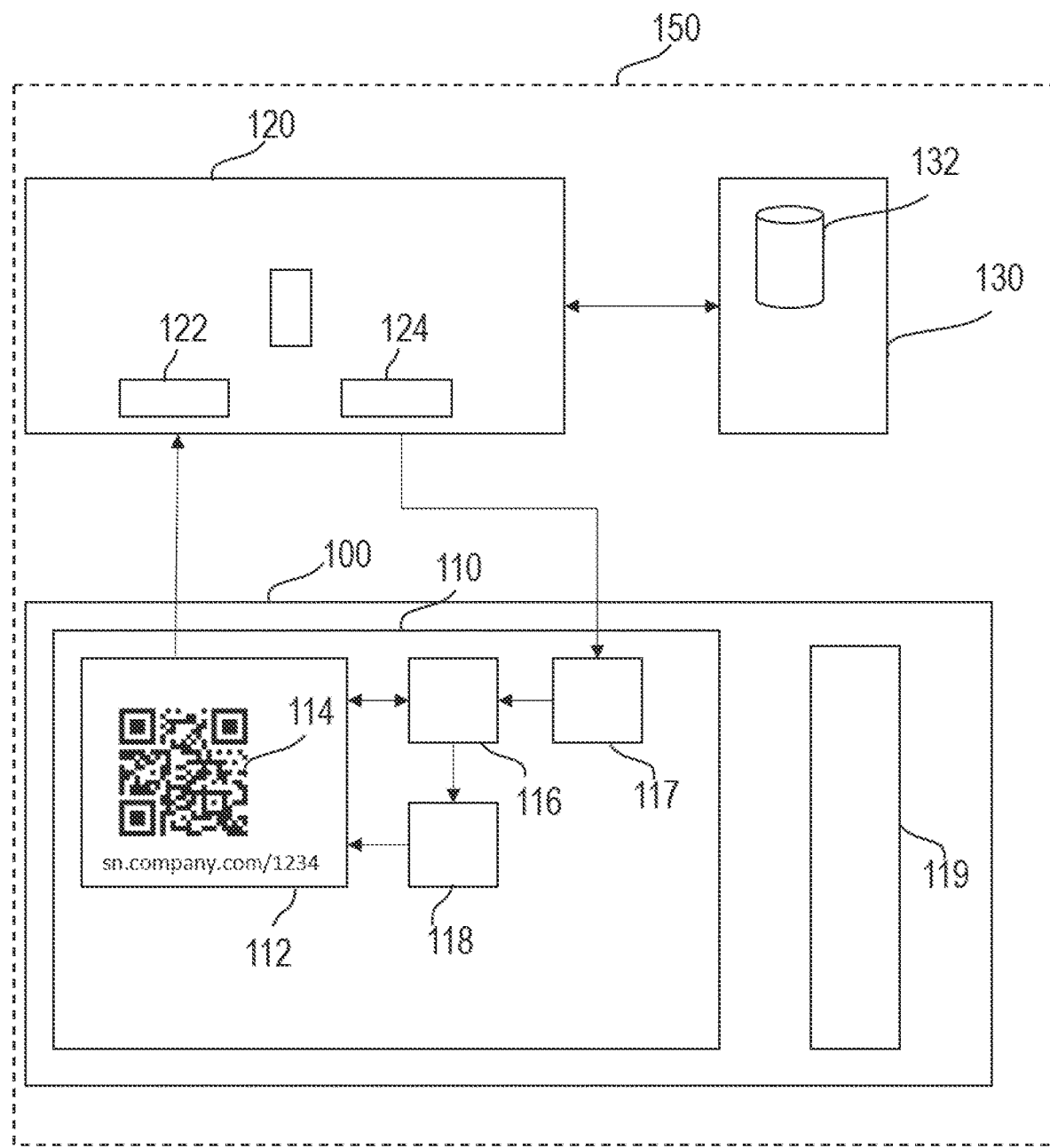
FIG. 1 is a block diagram of an industrial sensor with a display device.

FIG. 1 shows a block diagram of an industrial sensor system 150, which includes a sensor 100 having a display device 110 and sensor electronics 119. The display device 110 includes an electronic display 112. The electronic display shows a QR code 114 representing a link to a database 132 in which device-related information of the sensor 100 as well as other sensors is stored. The link or QR code 114 includes an ID of the sensor 100, for example "1234", so that the entry in the database 132 can be referenced. The code can be scanned by a user device 120 having a camera 122 and a communication unit 124, which connects to the database 132 of a server 130 and retrieves the device-related information of the sensor 100. Device-related information may include order code, order history, operating instructions, test certificates, certificates of compliance, safety instructions, backup of device settings, etc.

The display device 110 may further comprise a code generator 116 and a memory 118. The memory 118 contains, for example, the link to be encoded, which the code generator 116 encodes into a QR code, or it contains the QR code graphic 114 itself. The code generator can flexibly change the link or ID, or encode additional information that can be displayed on the user device 120, for example, or transmitted to the database 132, such as a current status of the sensor 100. Additional information, such as type and year of manufacture, can also be included in the link. The additional information may be included in the link, for example, and may be parsed by the user device 120 or the server 130 or the database 132. The user device 120 may delete additional information from the link by parsing.

Further, the display device 110 may include a communication unit, such as an NFC receiver, as an interface 117 that receives the retrieved device-related information from the user device 120 and stores it in the memory 118 so that this information can be displayed by the electronic display 112, both in response to the displaying or scanning of the code 114 and afterwards, i.e., "offline".

The database 130 and the sensor 100 with the display arrangement or display device 110 are part of an industrial sensor system 150, to which other units may also be assigned, such as the server 130 and/or the user device 120.

Figure 2:
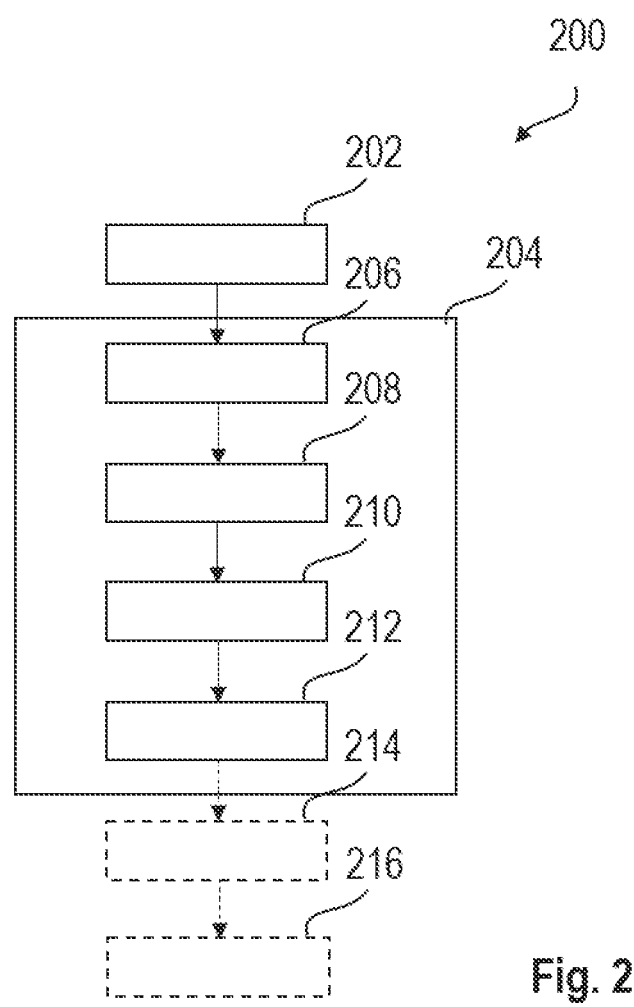
FIG. 2 shows a method for retrieving device-related information via an industrial sensor.

FIG. 2 shows a flowchart of a method 200 for retrieving device-related information about a sensor 100 of an industrial sensor, comprising the steps of: displaying 202, by a display device 110 of the sensor 100, encoded information on an electronic display 102 of the industrial sensor, and retrieving 204 the device-related information about the sensor 100 from a database 132.

The step of retrieving 204 the device-related information about the sensor 100 from the database 132 is performed by a user device 120 and further comprises the following steps: scanning 206 the optical code 141, decoding 208 the optical code 114 and obtaining a link to a database, establishing 210 a connection to the database 132 using the link, and receiving 212 the device-related information about the sensor 100 from the database 132 via the connection 132. It is understood that sending to and receiving from the database 132 is done indirectly through a communication device. For example, the database 132 is accessible through a server 130 that performs access to the database 132 and is the remote end of the connection to the user device 120.

The method 200 may optionally, and therefore shown in dashed lines in FIG. 2, include the steps of receiving 214 device-related information by the sensor 100 and displaying 216 the device-related information by the electronic display 102. That is, in this case, the user device 120 sends the data received from the database 132, at least in part, to the sensor 100, which can then display it.

Thus, a permanently stable display of the code 114 is provided, characterized by flexibility and adaptability, and having capabilities far beyond an ordinary nameplate on an industrial sensor 100.

The invention claimed is:

1. A display device for an industrial sensor, comprising an electronic display configured to display coded information,
wherein the coded information is information for retrieving device-related information about the sensor from a database, which is not a part of and is not connected to the display device,
wherein the coded information includes a sensor-specific link to the database, and
wherein the device-related information to be retrieved is not stored in the display device.

2. The display device according to claim 1, wherein the coded information is an optical coding in the form of a QR code, a bar code, or a numeric code.

3. The display device according to claim 1, wherein the device-related information about the sensor is one or more of the following: order code, order history, operating instructions, test certificates, certificates of conformity, safety instructions, and backup of device settings.

4. The display device according to claim 1, further comprising a code generator configured to generate the optical coding.

5. The display device according to claim 1, further comprising an interface configured to receive coded information, information to be encoded, and/or device-related information.

6. An industrial sensor system, comprising
a sensor comprising a display device according to claim 1, comprising an electronic display, wherein the electronic display is configured to display coded information; and
a database containing device-related information about the sensor,
wherein the sensor provides access to the database by means of the electronic display by displaying the coded information to enable retrieval of the device-related information about the sensor.

7. The industrial sensor system according to claim 6, wherein the database contains at least partially authorization-protected information.

8. The industrial sensor system according to claim 6, wherein the industrial sensor system is configured to use optical coding on the electronic display of the sensor to retrieve device-related information about the sensor.

9. A method for retrieving device-related information about a sensor of an industrial sensor, comprising the step of:
displaying, by a display device of the sensor, encoded information on an electronic display of the industrial sensor to retrieve the device-related information about the sensor from a database, which is not a part of and is not connected to the display device,
wherein the encoded information includes a sensor-specific link to the database, and
wherein the device-related information to be retrieved is not stored in the display device.

10. The method according to claim 9, wherein the encoded information includes a link to the database and an ID of the sensor.

11. The method according to claim 9, wherein retrieving the device-related information via the sensor comprises the following steps performed by a user device:
- retrieving device-related information about the sensor from the database, the retrieving comprising the steps of:
  - scanning of optical code,
  - decoding the optical code and obtaining a link to a database,
  - establishing a connection to the database using the link, and
  - receiving device-related information about the sensor from the database via the connection.

12. The method according to claim 9, further comprising the following steps performed by the sensor:
- receiving the device-related information about the sensor from the database, and
- displaying the device-related information by the electronic display.

13. The method according to claim 11, wherein the user device is configured to retrieve the device-related information about an industrial sensor, comprising:
- a camera configured to scan the optical code,
- a decoder configured to decode the optical code and obtain a link to a database, and
- a communication unit configured to establish a connection to the database using the link and to receive the device-related information about the sensor from the database via the connection.

* * * * *